United States Patent
Stahl et al.

(10) Patent No.: US 6,708,802 B2
(45) Date of Patent: Mar. 23, 2004

(54) FLOATING CALIPER FOR A DISK BRAKE, AND DISK BRAKE

(75) Inventors: Peter Stahl, Neuenahr-Ahrweiler (DE); Hans Martin Giese, Polch (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 10/308,676

(22) Filed: Dec. 3, 2002

(65) Prior Publication Data

US 2003/0089559 A1 May 15, 2003

Related U.S. Application Data

(63) Continuation of application No. PCT/EP01/06396, filed on Jun. 6, 2001.

(30) Foreign Application Priority Data

Jun. 7, 2000 (DE) .......................................... 100 27 783
Jun. 8, 2000 (DE) .......................................... 100 27 996

(51) Int. Cl.⁷ .............................................. F16D 55/00
(52) U.S. Cl. ..................................... 188/71.1; 188/73.1
(58) Field of Search ............................. 188/73.1, 71.1, 188/73.47, 73.45

(56) References Cited

U.S. PATENT DOCUMENTS

| 4,878,564 A | * | 11/1989 | Kondo ..................... 188/73.31 |
| 5,022,500 A | * | 6/1991 | Wang ....................... 188/73.31 |
| 5,181,588 A | * | 1/1993 | Emmons .................. 188/73.31 |
| 5,234,080 A | * | 8/1993 | Pantale ...................... 188/71.1 |
| 5,343,985 A | * | 9/1994 | Thiel et al. ................. 188/72.5 |
| 5,394,963 A | * | 3/1995 | Deane et al. ............ 188/73.31 |
| 5,464,077 A |   | 11/1995 | Thiel et al. |
| 5,472,068 A | * | 12/1995 | Weiler et al. ............. 188/73.44 |
| 5,957,245 A | * | 9/1999 | Anger et al. ................ 188/71.1 |

FOREIGN PATENT DOCUMENTS

| DE | 8236515 | 6/1984 |
| DE | 4401843 | 7/1995 |
| JP | 11063040 | 3/1999 |
| US | 98/02338 | 1/1998 |

\* cited by examiner

*Primary Examiner*—Robert A. Siconolfi
(74) *Attorney, Agent, or Firm*—MacMillan, Sobanski & Todd, LLC

(57) ABSTRACT

The floating caliper of a disk brake has three bridge arms, which extend over the brake disk, wherein one of the bridge arms, preferably the middle arm (34), is bifurcated into two branches (34*a*, 34*b*).

8 Claims, 2 Drawing Sheets

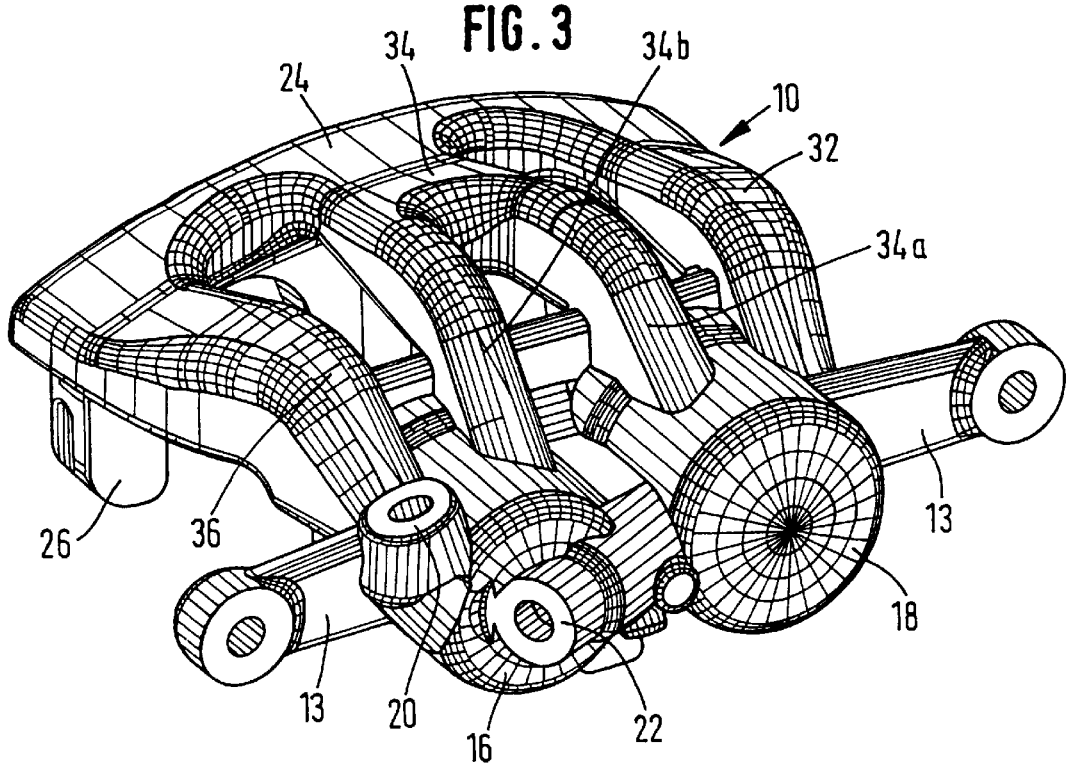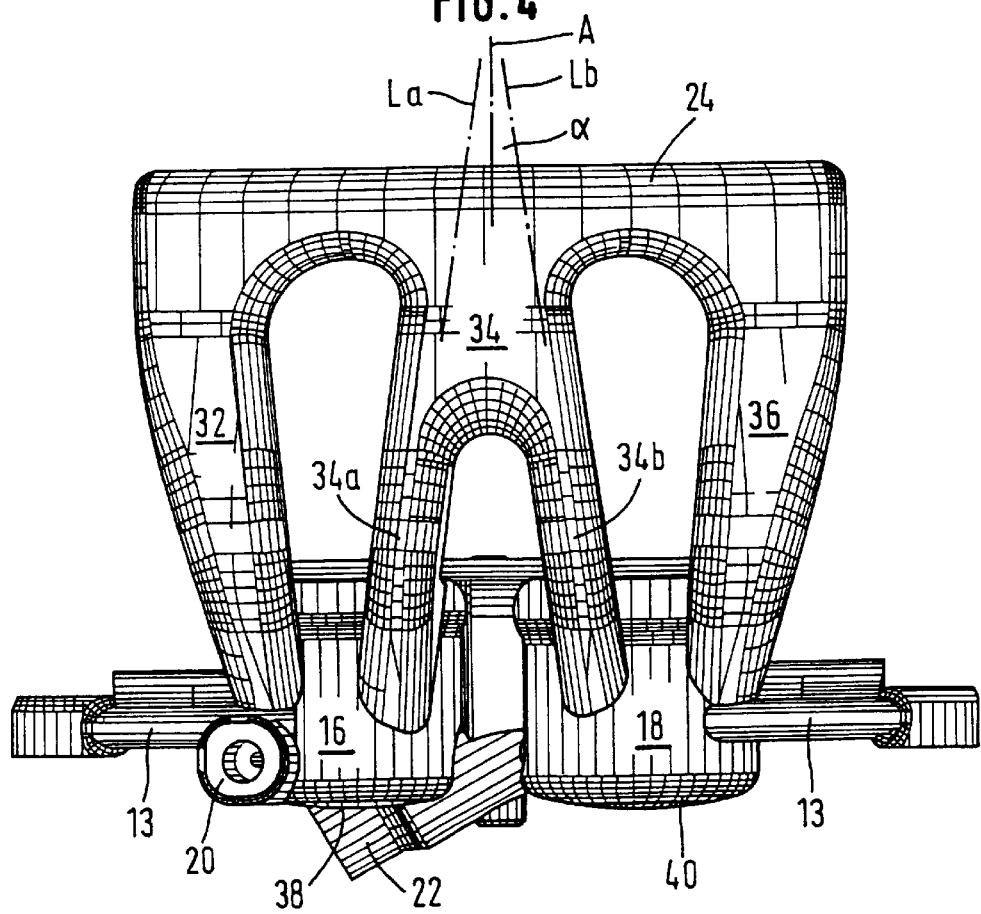

FLOATING CALIPER FOR A DISK BRAKE, AND DISK BRAKE

CROSS REFERENCE TO RELATED APPLICATIONS

This application is a continuation of International Application No. PCT/EP01/06396 filed Jun. 6, 2001, which claimed priority to German Patent Applications No. 10027783.7 filed Jun. 7, 2000 and No. 10027996.1 filed Jun. 8, 2000, the disclosures of which are incorporated herein by reference.

BACKGROUND OF THE INVENTION

The invention relates to a floating caliper for a disk brake as well as to a brake disk equipped therewith, in particular to a floating-caliper partial-lining disk brake.

The invention preferentially relates to a floating-caliper partial-lining disk brake with two actuating cylinders. Such disk brakes are generally known to the person skilled in the art.

In automobile manufacture, the trend is increasingly towards weight reduction without sacrificing performance and safety.

In floating caliper brakes, such as are under discussion here, two brake shoes are in a known manner pressed from both sides onto the rotating brake disk and the friction forces bring about the braking operation. The friction forces are introduced via the floating caliper into the brake anchor plate. Thus, during braking parts of the brake necessarily have to bend and, when designing brakes, it is a question of achieving the highest possible flexural strength with the lowest possible weight of the brake. This is the object of the present invention.

German Utility Model DE 82 36 515 U1 describes a disk brake, in which the floating caliper has ribs, which increase the flexural strength while simultaneously reducing the weight.

In disk brakes with two actuating cylinders, which are generally known to the person skilled in the art and in which the present invention is preferentially used, it is known in the prior art to support the outer brake lining by means of three supporting fingers, via which the clamping force upon the outer brake lining is introduced.

In the prior art, the bridge of the floating caliper (i.e. the part of the caliper spanning the brake disk) is of a more or less solid construction or is strengthened by ribs in order to achieve the high flexural strength mentioned above. The bridge region of the floating caliper is in said case permanently connected, as a rule integrally cast, with the actuating cylinder or the (two) actuating cylinders.

SUMMARY OF THE INVENTION

To achieve the object stated above, the present invention proposes a floating caliper for a disk brake, which floating caliper has at least one actuating cylinder and a brake shoe support lying opposite the latter, characterized in that at least one bridge arm connecting the actuating cylinder to the support is bifurcated.

According to a preferred development of the floating caliper, it is provided that the bifurcated bridge arm is bifurcated in the direction of the brake cylinder into two branches.

The bifurcation, i.e. the point, at which the bridge arm splits into two branches, is preferably disposed in such a way that it lies, in the installed state of the brake, at least approximately above or immediately adjacent to the brake disk.

As stated, the invention is preferentially used in a floating-caliper disk brake with two actuating cylinders, which is known as such. In said case, the bifurcation of at least one bridge arm is designed in such a way that each one of the branches leads to one of the actuating cylinders. In a floating-caliper brake with two actuating cylinders, preferably three bridge arms are provided, wherein preferably the middle bridge arm is bifurcated in the described manner.

At the opposite side of the floating caliper to the actuating cylinders it is preferably provided that the bridge arms are connected by a cross strut constructed integrally with them.

In a particularly preferred manner it is provided that the bridge arms in their longitudinal direction are aligned in each case with a supporting finger of the support, wherein the supporting fingers are substantially perpendicular to the longitudinal direction of the bridge arms. Said supporting fingers are therefore used to support and introduce the clamping force in the outer brake shoes. Their being designed in the described manner enables a high stability of the overall system of the brake, in particular a high flexural strength, while further reducing the weight.

A further preferred development of the invention provides that the bridge arms extend separately from one another over substantially the entire distance between the actuating cylinders and the support. In said development, the bridge arms are therefore substantially independent of one another and are connected to one another at the one side of the brake (the side towards the inside of the vehicle) by the two integrally constructed actuating cylinders and at the other side by a relatively narrow cross strut, i.e. a strut lying at right angles to the axial centre plane of the brake. The axial centre plane of disk brakes is defined as the plane, in which the axis of the disk lies and which is the plane of symmetry of the brake. In a brake with two actuating cylinders, said plane therefore extends between the actuating cylinders.

In a preferred manner the fork branches of the bifurcated bridge arm extend, not exactly parallel to the axial plane of symmetry of the brake, but outwards at a slight angle to the latter, e.g. at angles within the range of 3° to 15°.

The outer bridge arms, i.e. the arms on the inlet side and the outlet side of the brake, likewise extend preferably not exactly parallel to the axial plane of symmetry of the brake but at slight angles of inclination, which lie likewise within the previously described range, wherein the inclinations of the branches, on the one hand, and of the said outer bridge arms, on the other hand, are in exactly opposite directions, as is clearly evident from the drawings.

The invention relates also to a disk brake having a floating caliper, which presents at least some of the previously described features.

BRIEF DESCRIPTION OF THE DRAWINGS

There now follows a detailed description of an embodiment of the invention with reference to the drawings. The drawings show:

FIG. 3 a perspective view of a floating caliper on its own; and

FIG. 4 a plan view of the floating caliper according to FIG. 3.

DETAILED DESCRIPTION OF THE INVENTION

Figure 1:
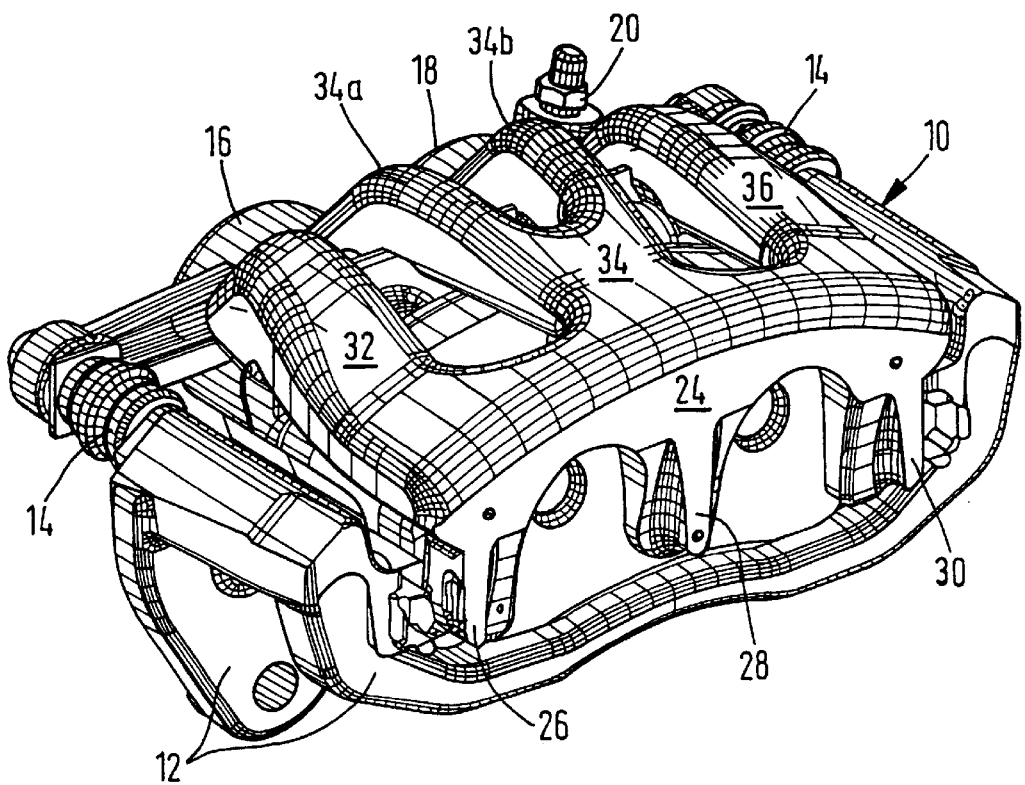
FIG. 1 a perspective view of a disk brake with a floating caliper.

A floating caliper 10 of a floating-caliper disk brake is illustrated in the drawings, wherein parts of the brake which are known as such, such as e.g. details of the brake anchor plate, the fastening of the latter to the vehicle, and the brake disk, have been omitted in order to lend greater prominence to the details of the floating caliper.

The floating caliper 10 is fastened to a brake anchor plate 12. For said purpose, brackets 13 on the floating caliper are used (cf. FIG. 3, FIG. 4).

The floating caliper 10 is in a known manner guided on bolt guides 14 of the brake anchor plate so as to be movable in axial direction of the brake, i.e. in the direction of the axis of the disk.

In the illustrated embodiment, the floating caliper 10 in a known manner has two actuating cylinders 16, 18 for brake pistons (not shown). The actuating cylinders 16, 18 are supplied with hydraulic fluid via a hydraulic fluid inlet 22. A neck for a bleeder screw is denoted by 20.

At the opposite side to the actuating cylinders, i.e. at the side lying in the installed state at the outside of the vehicle, the floating caliper 10 has a cross strut 24, which lies at right angles to the plane of symmetry (FIG. 4) of the brake. From the cross strut 24 supporting fingers 26, 28, 30 extend substantially at right angles to the principal plane of the caliper, i.e. at least approximately parallel to the plane of symmetry of the brake. The supporting fingers 26, 28, 30 are therefore substantially perpendicular to the principal plane of the caliper 10, which extends through the bridge arms 32, 36, i.e. at right angles to the axial plane of symmetry of the brake containing the longitudinal axis A of the brake disk.

The supporting fingers 26, 28, 30 are disposed in an aligned manner in relation to the bridge arms 32, 34, 36, i.e. viewed in the direction of the axis, the supporting finger 26 is aligned with the bridge arm 32, the supporting finger 28 is aligned with the bridge arm 34 and the supporting finger 30 is aligned with the bridge arm 36.

All of the parts of the floating caliper illustrated in FIG. 3, i.e. the actuating cylinders 16, 18, the bridge arms 32, 34, 36, the cross strut 24, the supporting fingers 26, 28, 30 and the brackets 13 for fastening to the brake anchor plate, are integrally moulded, i.e. cast.

Figure 2:
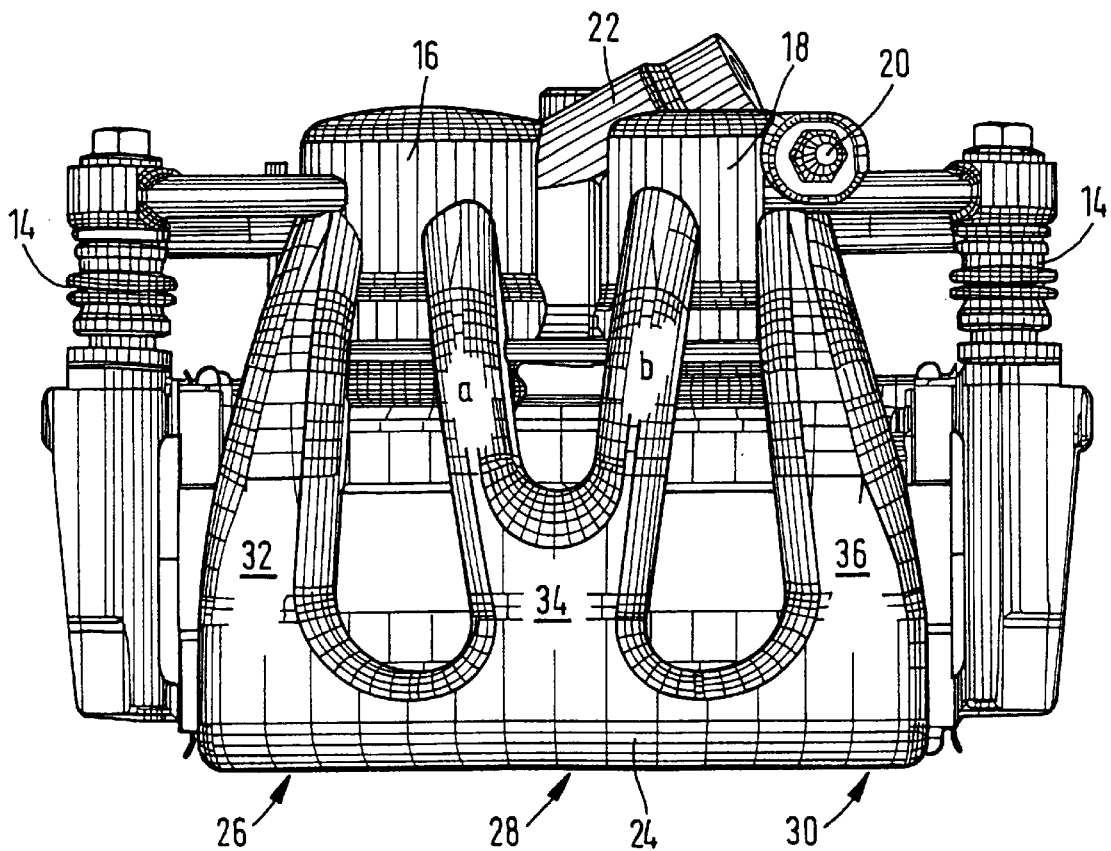
FIG. 2 a plan view of the disk brake with floating caliper according to FIG. 1.

As may be seen in particular from FIGS. 2 and 4, in the illustrated embodiment the middle bridge arm 34 is bifurcated into two branches 34a, 34b. The branch 34a is integrally connected to the actuating cylinder 16 and the branch 34b is integrally connected to the actuating cylinder 18. The bifurcation, i.e. the point at which the bridge arm 34 splits into the two branches 34a, 34b, lies approximately midway (with a deviation of ±25%) between the cross strut 24, which has the supporting fingers, and the front edge of the actuating cylinders 16, 18.

According to FIG. 4, in the illustrated embodiment the fork branches 34a, 34b of the middle bridge arm 34 do not extend exactly parallel to the plane of symmetry of the brake, which plane of symmetry in FIG. 4 is perpendicular to the drawing plane and contains the axis A of the brake. Rather, the branches 34a, 34b in the illustrated manner are inclined in relation to the plane of symmetry at an angle α, which is between 3° and 15°, preferably between 3° and 10°.

According to FIG. 4 the inclination is such that from the, in relation to the vehicle, outer side to the inner side the branches 34a, 34b diverge. The longitudinal axes La and Lb of the two branches 34a and 34b intersect in the plane of symmetry approximately outside of the support, formed by the cross strut 24 and the supporting fingers 26, 28, 30, for the brake shoe disposed at the outside of the vehicle.

Upon actuation of the brake, the clamping force upon the outer brake lining (not shown), which is supported by the cross strut 34 and the three supporting fingers 26, 28, 30, is introduced in a known manner through displacement of the caliper as a result of actuation of the actuating pistons (not shown), which are guided in the actuating cylinders 16, 18. The axial clamping force is transmitted via the bases 38, 40 of the cylinders 16, 18, the cylinder walls and the bridge arms 32, 34, 34a, 34b, 36 and the cross strut 24 to the supporting fingers 26, 28, 30.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The bridge arms 32, 36, which are disposed at the inlet side and outlet side of the brake, are disposed as far out as possible in relation to the centre axial plane of symmetry of the brake.

What is claimed is:

1. Floating caliper for a disk brake, comprising two actuating cylinders and a brake shoe support lying opposite the actuating cylinders, wherein three bridge arms connect the actuating cylinders to the brake shoe support and wherein at least one bridge arm is bifurcated, wherein the bifurcated bridge arm is bifurcated in a direction towards the actuating cylinders into two branches and wherein each of the branches leads to one of the actuating cylinders.

2. Floating caliper for a disk brake according to claim 1, wherein the bifurcation lies at least approximately midway between the actuating cylinder and the brake shoe support.

3. Floating caliper for a disk brake according to claim 1, wherein the bridge arms are connected at the brake shoe support by a cross strut.

4. Floating caliper for a disk brake according to claim 1, wherein the bridge arms in their longitudinal direction are aligned in each case with a supporting finger of the brake shoe support, wherein the supporting fingers are disposed substantially at right angles to the longitudinal direction of the bridge arms.

5. Floating caliper for a disk brake according to claim 1, wherein the bridge arms extend separately from one another over substantially the entire distance between the actuating cylinders and the brake shoe support.

6. Floating caliper for a disk brake according to claim 1, wherein only the middle bridge arm is bifurcated and each of its branches leads to one of the two actuating cylinders.

7. Floating caliper for a disk brake according to claim 6, wherein the longitudinal axes of the branches of the middle bridge arm extend at angles of between 3° and 15° relative to an axial direction of the brake.

8. Floating-caliper disk brake having a floating caliper according to claim 1.

* * * * *